(12) United States Patent
Heinzelmann et al.

(10) Patent No.: US 9,549,145 B2
(45) Date of Patent: Jan. 17, 2017

(54) LASER PROJECTION DEVICE AND LASER PROJECTION METHOD FOR PROJECTING LASER BEAMS ONTO A PROJECTION PLANE

(71) Applicant: Robert Bosch GmbH, Stuttgart (DE)

(72) Inventors: Wolfgang Heinzelmann, Kirchentellinsfurt (DE); Frank Fischer, Gomaringen (DE); Thomas Hilberath, Eningen U.A. (DE); Gael Pilard, Wankheim (DE); Alexander Ehlert, Schwaebisch Gmuend (DE)

(73) Assignee: ROBERT BOSCH GMBH, Stuttgart (DE)

( * ) Notice: Subject to any disclaimer, the term of this patent is extended or adjusted under 35 U.S.C. 154(b) by 249 days.

(21) Appl. No.: 14/277,354

(22) Filed: May 14, 2014

(65) Prior Publication Data
US 2014/0340585 A1  Nov. 20, 2014

(30) Foreign Application Priority Data
May 14, 2013  (DE) .................. 10 2013 208 819

(51) Int. Cl.

| | |
|---|---|
| *G03B 21/14* | (2006.01) |
| *H04N 9/14* | (2006.01) |
| *H04N 5/74* | (2006.01) |
| *G02B 26/12* | (2006.01) |
| *H04N 9/31* | (2006.01) |
| *G02B 26/08* | (2006.01) |
| *G02B 27/48* | (2006.01) |
| *G02B 26/10* | (2006.01) |

(52) U.S. Cl.
CPC .......... *H04N 5/7416* (2013.01); *G02B 26/08* (2013.01); *G02B 26/123* (2013.01); *G02B 27/48* (2013.01); *H04N 9/3129* (2013.01); *H04N 9/3164* (2013.01); *G02B 26/101* (2013.01)

(58) Field of Classification Search
CPC ...... H04N 9/14; H04N 9/3129; H04N 9/3164; H04N 9/31; G03B 21/14; G02B 26/08; G02B 26/10; G02B 26/101; G02B 26/105; G02B 26/123
USPC ......... 359/196.1, 197.1, 201.1, 201.2, 204.1, 359/204.2, 212.1, 212.2, 223.1; 353/31, 353/98
See application file for complete search history.

(56) References Cited

U.S. PATENT DOCUMENTS

| | | | |
|---|---|---|---|
| 6,798,575 B2 * | 9/2004 | Kobayashi ........... | G02B 26/101 348/E9.026 |
| 7,513,624 B2 * | 4/2009 | Yavid ................... | H04N 9/3129 353/121 |
| 8,928,720 B2 * | 1/2015 | Towner ................. | B41J 2/473 347/253 |

(Continued)

*Primary Examiner* — William C Dowling
(74) *Attorney, Agent, or Firm* — Norton Rose Fulbright US LLP; Gerard Messina

(57) ABSTRACT

A laser projection device is described for projecting laser beams onto a projection plane, including a controllable multibeam laser diode unit; including a controllable optical deflection unit, which is designed in such a way that laser beams generated by the multibeam laser diode unit are deflected with the aid of the deflection unit; and including a control unit, which is designed in such a way that it controls the deflection unit to move laser beams deflected by the deflection unit onto a projection plane along a scanning line in such a way that different deflected laser beams run in the projection plane on the same scanning line.

22 Claims, 6 Drawing Sheets

(56) References Cited

U.S. PATENT DOCUMENTS

| | | | |
|---|---|---|---|
| 9,298,013 B2* | 3/2016 | Chikaoka | G02B 27/48 |
| 2005/0140832 A1* | 6/2005 | Goldman | H04N 9/3129 |
| | | | 348/746 |
| 2012/0013852 A1* | 1/2012 | Champion | G02B 26/101 |
| | | | 353/31 |

* cited by examiner

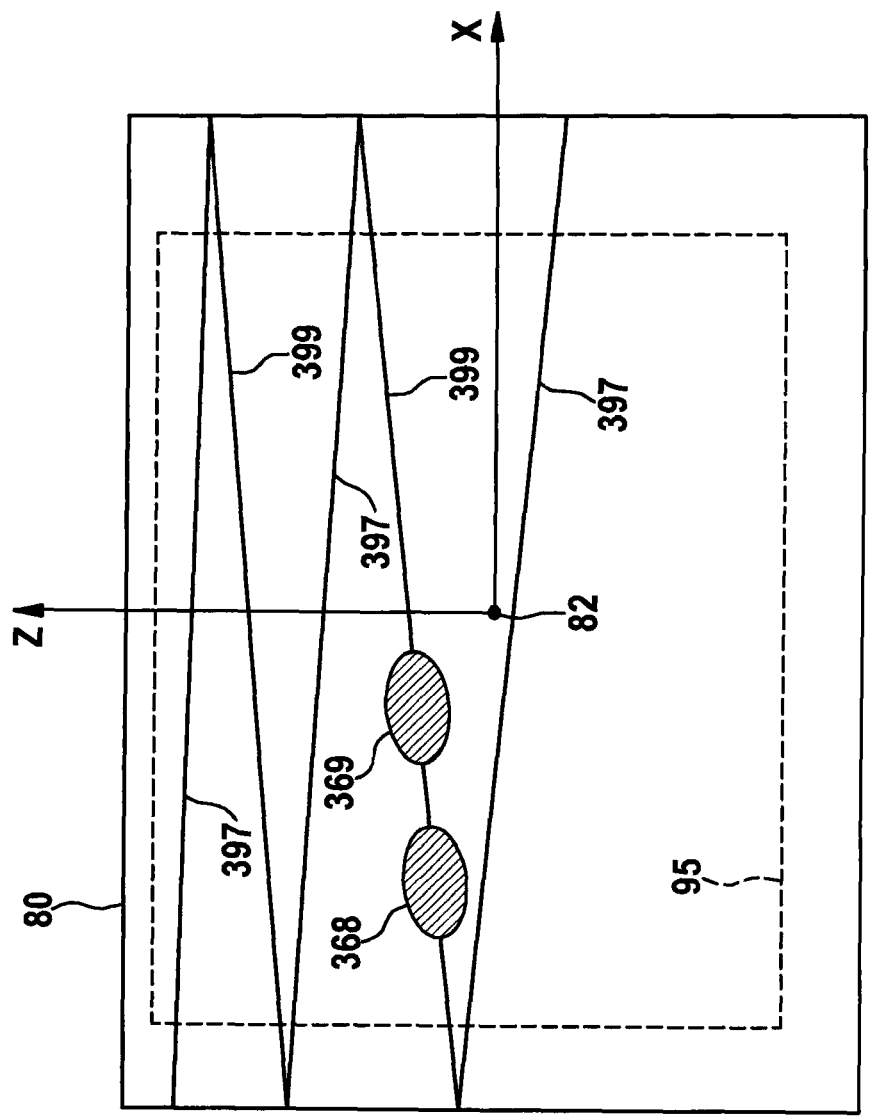

LASER PROJECTION DEVICE AND LASER PROJECTION METHOD FOR PROJECTING LASER BEAMS ONTO A PROJECTION PLANE

FIELD OF THE INVENTION

The present invention relates to a laser projection device and a laser projection method for projecting laser beams onto a projection plane.

BACKGROUND INFORMATION

Conventional video projectors are generally relatively large, heavy, and sensitive, so that they are less suitable for mobile use. In addition, such devices have a comparatively high power consumption and the colors produced sometimes appear faint, for example, if sunlight is incident on the projection surface.

The technologies which may be used in miniaturized projectors include laser scanners. In laser scanners, laser beams emitted by laser diodes are moved in such a way that they scan a projection surface. Laser beams are generally moved along horizontal scanning lines. When the entire horizontal width of the desired projection surface has been traveled through along a scanning line, the scanning line is vertically shifted.

A color image is generated by superimposing laser beams of different colors and by targeted projection and non-projection of the laser beams. This takes place by using such a high repetition frequency that an overall image arises for the human eye, similarly as in the case of scanning of the luminescent coating of a CRT television using an electron beam. Such laser scanners are small and generate images having strong colors. In addition, they operate very energy efficiently, since a laser beam only has to be turned on in each case when it is actually required for the projection.

However, it may be problematic in the case of such laser scanners that the image projected by laser scanners onto a surface generally has the so-called speckle effect. This speckle effect, which is also referred to as a light granulation effect, arises due to interference of the coherent laser light on unevenness of the surface and causes the image to appear grainy and partially slightly moving. The speckle effect is perceived to be unpleasant, which is presently detrimental to the market acceptance of the laser scanners.

Various methods are known for reducing the contrast of the speckle interference pattern. One of these methods provides the generation of a running, locally modulated interference strip system. Such an interference strip system is generated while using an ultrasonic cell in German Published Patent Appln. No. 197 10 660. The scanning laser beam is divided with the aid of the ultrasonic cell into various diffraction orders having different frequencies, which are subsequently superimposed again.

SUMMARY

The present invention provides a laser projection device and a corresponding laser projection method.

According to the present invention, a laser projection device for projecting laser beams onto a projection plane is provided, including a controllable multibeam laser diode unit, including a controllable optical deflection unit, which is designed in such a way that laser beams generated by the multibeam laser diode unit are deflected with the aid of the deflection unit, and including a control unit, which is designed in such a way that it controls the deflection unit to move laser beams deflected by the deflection unit onto a projection plane along a scanning line in such a way that different deflected laser beams run on the same scanning line in the projection plane.

A multibeam laser diode unit may be any unit which generates or emits multiple laser beams while using semiconductor technologies. The multibeam laser diode unit may be a so-called "dual beam diode," in which two laser diodes are integrated into a semiconductor body. "Quad beam diodes" having four integrated laser diodes or in general "multibeam diodes" may also be used. The semiconductor layers of such laser diodes are generally hermetically encapsulated in a so-called "TO-CAN package." For a miniaturized laser scanner, a "pico projector," the use of 3.8 mm TO-CAN laser diodes is particularly advantageous because of their small size. The control unit may have a microprocessor, for example. The deflection unit may have mirrors and actuators, or also apertures, filters, and other optical components.

The idea on which the present invention is based is to provide a laser projection device, in which multiple laser beams of the same color from different sources are superimposed for the eye of an observer in such a way that the speckle effect is at least reduced.

Although the running of laser beams or projection points of the laser beams on scanning lines in a projection plane are discussed, this does not mean that laser beams must actually run along this scanning line during the projection of laser beams. This may also mean that laser beams would run on corresponding scanning lines if laser beams were emitted constantly or intermittently. In this way, scanning paths and/or various specific embodiments of the deflection unit could be described. A projection point does not necessarily have to describe an actual laser point, but rather may refer to a point on which a laser beam would be incident, if it were emitted at a certain point in time.

The projection plane may be a specially provided and possibly coated projection screen. In the case of mobile use of the laser projection device, however, a wall, a room ceiling, or an object may also be used as a projection plane. The projection plane does not necessarily have to be flat, but rather may also have a curvature. The desired image may be projected onto a part of the projection plane, the image surface.

The scanning lines may run over the projection plane in various patterns according to various scanning paths. It is advantageous if the scanning lines permeate the image surface so densely that the resulting image has a desired minimum resolution and all parts of the image may be displayed.

Laser beams from various sources have different coherence properties, so that the interference patterns which are caused by the same point of the projection surface differ from one another. The maxima and minima of the particular interference patterns thus approximately average out, and the subjective impression for the observer is more pleasant.

Image data or video data are generally transmitted line by line, i.e., not as a total packet having the image data for filling the entire projection surface. If the deflected laser beams run on the same scanning line according to the present invention, only data corresponding to at most one scanning line must always be provided to the control device at a certain point in time. Therefore, less data must be transmitted per unit of time, which makes the laser projection device less demanding and therefore more reliable, more versatile, and more reasonably priced.

According to one preferred refinement, the deflection unit has at least two pivotable mirrors, an actuator controllable via the control unit being associated with each mirror. The mirrors may be designed as micro-mirrors and/or micro-mirror actuators. At least one separate actuator may be associated with each mirror. However, one actuator may also be associated with multiple mirrors. The actuators are used for the purpose of pivoting mirrors around a particular mirror axis of rotation. The mirror axes of rotation may be located inside the particular mirror, or also outside thereof. Various technologies are known, which may be used to pivot and/or move the mirrors, in particular micro-mirrors, including electromagnetic systems. The actuators may be implemented by electric motors, for example. Alternatively, systems of electromagnets and permanent magnets may also be used.

The mirrors may be situated and designed in such a way that by pivoting at least one first mirror around a first mirror axis of rotation and by pivoting at least one second mirror around a second mirror axis of rotation, the emitted laser beams are movable along the scanning lines. The mirrors may be situated and designed in such a way that the scanning lines on the projection surface pass through an image surface on the projection surface in a zigzag. In this way, the entire desired image may be displayed by the scanning lines guided over the projection surface in the image surface. Various scanning paths are possible, which may be set flexibly to the method, for example, using which image data are transmitted to the laser projection device, so that better miniaturization is implementable. Instead of a zigzag passage, another design of the scanning lines may also be used. For example, the scanning lines may each pass through the image surface from one side to the other, for example, from left to right.

According to a further preferred refinement, the deflection unit has a collimator unit. The collimator unit and the multibeam diode unit may be designed and situated in such a way that preferably all or also only a few, for example, of the laser beams generated by the multibeam laser diode unit traverse the collimator unit. Laser beams generated from various laser sources must generally each pass through separate collimator units, since their optical properties are to be tailored to their properties. If only one collimator unit is advantageously used, the costs and space requirement of the laser projection unit are decreased.

The first mirror and the second mirror may be designed as polygon mirrors according to one preferred exemplary embodiment. Polygon mirrors are designed, for example, in such a way that flat mirror surfaces are applied flush with one another on the jacket of a cylinder. A corresponding mirror axis of rotation may then extend along the axis of symmetry of the cylinder. The actuators may therefore be activated via the control unit in such a way that the polygon mirrors are always pivoted in a uniform rotational direction. The movements therefore run uniformly, which decreases the strain and therefore wear of the actuators and makes the laser projection unit more robust.

According to an alternative exemplary embodiment, the first mirror and the second mirror are designed as flat mirrors. The actuators may be activated via the control unit in this exemplary embodiment in such a way that the flat mirrors are always pivoted back and forth within a particular corresponding predefined angle range. One mirror, which causes the movement of the laser beams along the scanning lines, may be pivoted in a first rotational direction more rapidly around the corresponding mirror axis of rotation than in the opposite rotational direction. In this way, less time is necessary between the scanning of a first scanning line and the scanning of the following scanning line than for the scanning of an entire scanning line. The projection rate per unit of time may therefore be increased, for example. Flat mirrors are additionally relatively simple and cost-effective to produce. In addition, flat mirrors, in particular micro-mirrors and/or micro-mirror actuators, may be designed to be so small that they are suitable for use in miniaturized laser scanners and/or pico projectors.

According to another preferred refinement, the control unit has a transformation unit. It may be designed in such a way that it generates control instructions for the control unit from predefined image data or video data. These control instructions may be provided in such a way that the laser beams, which are generated by the multibeam laser diode unit controlled via the control unit using the control instructions, are deflected with the aid of the deflection unit controlled via the control unit using the control instructions in such a way that a projection pattern according to the image data or video data is generated separately by each laser beam in the projection plane. For example, if the laser beams are designed as red laser beams, the red channel of an image may be projected on a wall by the laser projection device as a projection pattern, for example. Due to the superposition of the projection patterns, which are drawn by various laser beams, the speckle effect decreases due to averaging out of the appearances of interference, as already described above. It may also be advantageous to provide beams from multiple laser sources for the display of the same projection pattern, if the power of the individual laser emission areas of the multibeam laser diode unit is limited, for example, because of a limited power supply or heat development. Depending on the specific embodiment, the laser emission areas may be spatially separated laser diodes, or also, for example, points spaced apart from one another on a dual beam laser diode, for example.

According to another preferred refinement, the control unit has a buffer memory unit. This buffer memory unit may be implemented, for example, by any conventional electronic memory. Control instructions, which are generated by the transformation unit, corresponding to at least one scanning line are storable beforehand by the buffer memory unit. Therefore, control instructions are calculated and stored before they are needed. Thus, for example, control instructions may be prevented from not being available or being provided late if a specific calculation requires a particularly large amount of time. Predefined image data or video data, from which control instructions corresponding to at least one scanning line may be generated by the transformation unit, may also be stored beforehand by the buffer memory unit. Thus, for example, it may be ensured that in the event of a temporary low transmission speed of image data or video data to the control unit, it has sufficient image data or video data present to be able to continue the control of the laser projection device until the transmission speed increases again.

According to another preferred refinement, the multibeam laser diode unit of the laser projection device may be integrated into a single semiconductor body. The laser projection device as a whole may thus be designed to be smaller and therefore more cost-effective. The semiconductor body here has at least two laser emission areas which are separated from one another, via which at least two laser beams may be emitted independently of one another. Alternatively, the multibeam laser diode unit may also have two or more semiconductor bodies, however.

According to another preferred refinement, the control unit of the laser projection device has a modulation unit, which is designed to modulate at least one laser emission area of the multibeam laser diode unit using a modulation frequency. By modulating a laser emission area, the interference patterns of the laser beam emitted therefrom are chronologically changed. For an observer, these chronological changes are superimposed. The speckle effect is thus additionally decreased, which makes the image still more pleasant for an observer.

According to another preferred refinement, the control unit of the laser projection device has a multimode unit, which is designed to operate at least one laser emission area of the multibeam laser diode unit in multimode operation. During multimode operation, laser light of multiple different oscillation modes arises simultaneously. The interference patterns which are generated by the various oscillation modes differ from one another and are superimposed for an observer. The speckle effect is thus additionally decreased, which makes the image still more pleasant for an observer.

According to another preferred refinement, the laser emission areas are designed in such a way that the emitted laser beams have wavelengths which lie within a narrow wavelength range. Thus, for example, multiple laser beams may have wavelengths in the red color spectrum. It may then be calculated very precisely how these laser beams may be combined with other laser beams, which are in the green or blue color spectrum, for example, to generate any arbitrary color of a color scheme required for the projection by way of color addition.

The above embodiments and refinements may be combined with one another as desired, if reasonable. Further possible embodiments, refinements, and implementations of the present invention also include combinations, which are not explicitly mentioned, of features of the present invention which are described above or hereafter with respect to the exemplary embodiments. In particular, those skilled in the art will also add individual aspects as improvements or supplements to the particular basic form of the present invention.

BRIEF DESCRIPTION OF THE DRAWINGS

FIG. 6 shows the course of scanning lines on a projection surface according to a fifth specific embodiment of the present invention.

DETAILED DESCRIPTION

Figure 1:
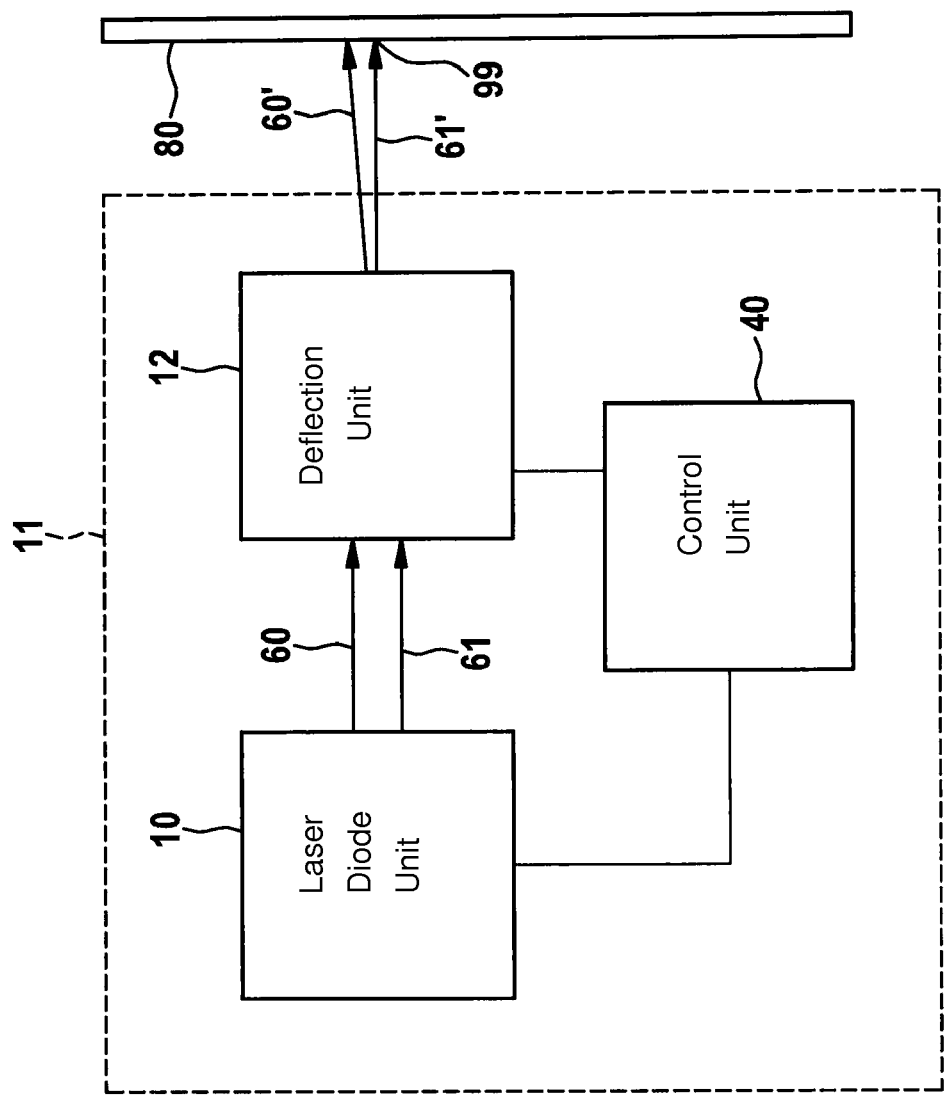
FIG. 1 shows a schematic top view to explain a laser projection device according to a first specific embodiment of the present invention.

In the figures, identical reference numerals identify identical or functionally identical elements, if not otherwise indicated to the contrary. The figures are not necessarily drawn to scale.

FIG. 1 shows a schematic top view of a laser projection device for projecting laser beams onto a projection plane according to a first specific embodiment of the present invention.

According to FIG. 1, laser projection device 11 for projecting laser beams onto a projection plane 80 has a controllable multibeam laser diode unit 10. This generates or emits laser beams 60, 61, which enter a deflection unit 12. Laser beams 60, 61 may be deflected, absorbed, filtered, polarized, or influenced in another way by deflection unit 12. Deflected laser beams 60', 61' leaving deflection unit 12 are guided or deflected onto projection surface 80. Deflected laser beam 60' is a laser beam 60, which is deflected and/or modified in another way by deflection unit 12, and which has left multibeam laser diode unit 10. Deflected laser beam 61' is a laser beam 61, which is deflected and/or modified in another way by deflection unit 12, and which has left multibeam laser diode unit 10.

A control unit 40 is coupled to controllable optical deflection unit 12 and controllable multibeam laser diode unit 10. Control unit 40 is designed for the purpose of moving laser beams 60', 61', which are deflected by deflection unit 12, on projection plane 80 along a scanning line 99. Different deflected laser beams 60', 61' run in projection plane 80 on the same scanning line 99. This is implemented in that control unit 40 transmits corresponding control instructions to deflection unit 12 and multibeam laser diode unit 10. In other words, the components of deflection unit 12, for example, mirrors, apertures, filters, absorbers, or polarizers, are moved or actuated according to control instructions by control unit 40 in such a way that different deflected laser beams 60', 61' run in projection plane 80 on the same scanning line 99.

Figure 2:
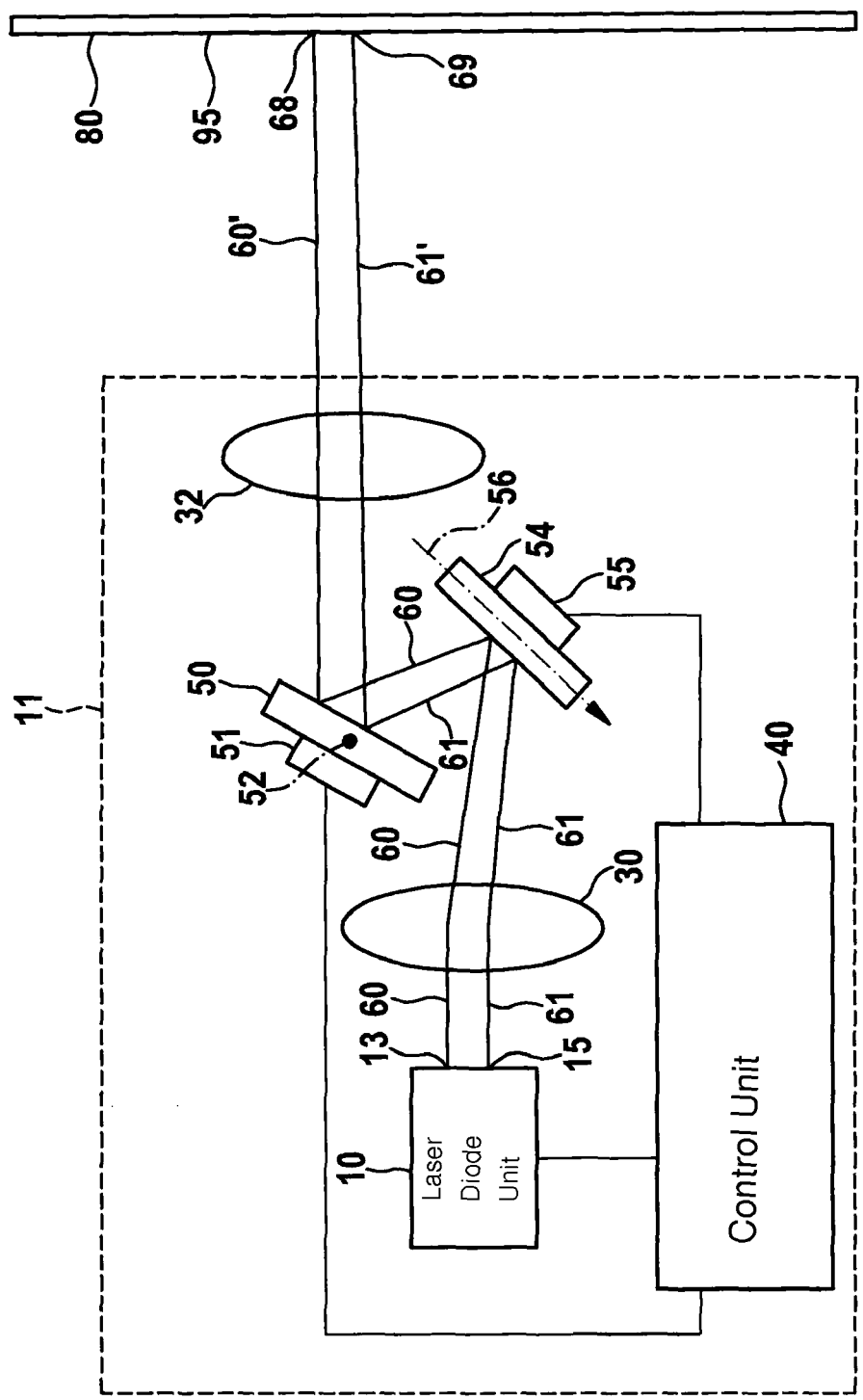
FIG. 2 shows a schematic top view to explain a laser projection device according to a second specific embodiment of the present invention.

FIG. 2 shows a schematic top view of a laser projection device for projecting laser beams onto a projection plane according to a second specific embodiment of the present invention.

According to the second specific embodiment, laser projection device 11 for projecting laser beams onto a projection plane 80 has a controllable multibeam laser diode unit 10, which contains two laser emission areas 13, 15 separate from one another. Laser emission area 13 generates a laser beam 60; laser emission area 15 generates a laser beam 61. Generated laser beams 60, 61 enter a collimator unit 30, which is a component of deflection unit 12. In the further course, laser beams 60, 61 are incident on a first mirror 50 and a second mirror 54. According to the second specific embodiment, laser beams 60, 61 are at first deflected by second mirror 54 and then by first mirror 50.

An actuator 51, which is controllable via control unit 40, is associated with first mirror 50. First mirror 50 is pivotable around a first mirror axis of rotation 52, and actuator 51 is designed in such a way that it may pivot first mirror 50 around first mirror axis of rotation 52. First mirror axis of rotation 52 is perpendicular to the plane of the drawing. First mirror 50 is designed as a flat mirror, which is moved back and forth by actuator 51 by angles within a first angle range.

An actuator 55, which is controllable via control unit 40, is associated with second mirror 54. Second mirror 54 is pivotable around a second mirror axis of rotation 56, and actuator 55 is designed in such a way that it may pivot second mirror 54 around second mirror axis of rotation 56. Second mirror axis of rotation 56 lies in the plane of the drawing. Second mirror 54 is designed as a flat mirror, which is moved back and forth by actuator 55 by angles within a second angle range.

First mirror axis of rotation 52 and second mirror axis of rotation 56 are skewed. The geometric projections of first mirror axis of rotation 52 and second mirror axis of rotation 56 onto projection surface 80 are perpendicular to one another. Mirrors 50, 54 and actuators 51, 55 are further components of deflection unit 12.

Laser beams 60, 61, which are deflected by first mirror 50 and by second mirror 54, pass through output optics 32, which is also a component of deflection unit 12, which is controllable via control unit 40. Output optics 32 may contain lenses, filters, apertures, polarization filters, absorbers, and other optical and mechanical components, which may also modify laser beams 60, 61 independently of one another. Output optics 32 may also be a window which is transparent to laser beams 60, 61. Deflected laser beam 60' is incident on projection surface 80 within a desired image surface 95 at projection point 68. Deflected laser beam 61' is incident on projection surface 80 within desired image surface 95 at projection point 69. According to the present invention, collimator unit 30, mirrors 50, 54, output optics 32, and multibeam laser diode unit 10 are controlled via control unit 40 in such a way that deflected laser beams 60', 61' always move essentially on the same scanning line 99 in projection plane 80. In other words, at a certain point in time, all projection points 68, 69 lie on scanning line 99, along which they move. Possible specific embodiments of the scanning lines are described hereafter with reference to Figure and FIG. 6.

Figure 3:
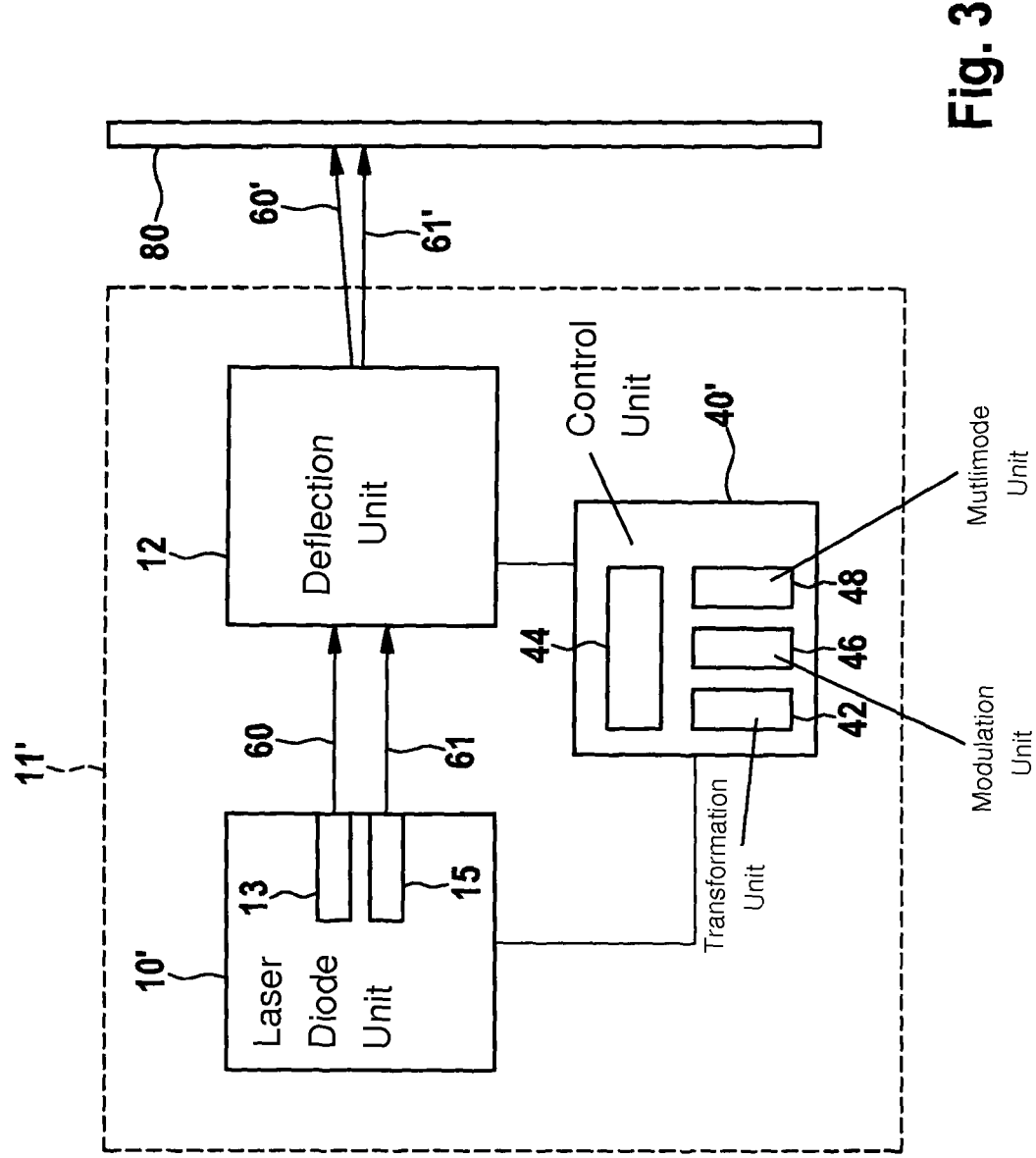
FIG. 3 shows a schematic top view to explain a laser projection device according to a third specific embodiment of the present invention.

FIG. 3 shows a schematic top view of a laser projection device for projecting laser beams onto a projection plane according to a third specific embodiment.

According to FIG. 3, laser projection device 11' according to the third specific embodiment of the present invention has a controllable multibeam laser diode unit 10', which has two laser emission areas 13, 15 separate from one another. Laser beams 60, 61 are generated or emitted by laser emission areas 13, 15 in FIG. 3. Laser emission areas 13, 15 may be individual semiconductor components which are separated from one another, or also any other unit which generates or emits more than one laser beam using semiconductor technologies. In particular, multibeam laser diode unit 10' may be a so-called "dual beam diode," in which two laser diodes are integrated into one semiconductor body. "Quad beam diodes" may also be used, in which four laser diodes are integrated. In dual beam diodes or quad beam diodes, the laser emission areas correspond to various functional areas of the integrated semiconductor body, which each generate or emit laser beams 60, 61.

Laser beams 60, 61, which are emitted or generated by laser emission areas 13, 15, as explained above with reference to FIGS. 1 and 2, are deflected and/or modified in another way by deflection unit 12.

According to the third specific embodiment, a control unit 40' is coupled both to multibeam laser diode unit 10' and to deflection unit 12. Control unit 40' may not only control how and where laser beams 60, 61 are deflected by deflection unit 12 but also whether or how they are additionally modified. Control unit 40' may additionally control multibeam laser diode unit 10'. It may thus be influenced via control unit 40' how, when, and with which properties laser beams 60, 61 are emitted or generated by laser emission areas 13, 15.

In particular, according to the third specific embodiment, control unit 40' has a modulation unit 46 and a multimode unit 48. Modulation unit 46 may modulate at least one laser emission area 13, 15 using a modulation frequency. The modulation frequency may be in the order of magnitude of 100 MHz, but may also be in the order of magnitude of 1 GHz. The modulation executed using the modulation frequency may be an amplitude modulation. Alternatively, the modulation may be a frequency modulation. A modulated laser beam may be generated or emitted by a modulated laser emission area. Modulated laser beams generate chronologically variable interference patterns on projection plane 80, the modulation frequency being able to be selected in such a way that the chronological change is not resolvable by the human eye. For the human eye or human perception, the interference patterns may be superimposed at various points in time, so that the speckle effect decreases.

Multimode unit 48 is designed in such a way that it may operate at least one laser emission area 13, 15 during multimode operation. This may be carried out additionally or alternatively to a modulation of laser emission areas 13, 15 by modulation unit 46. Although the third specific embodiment of the present invention shown in FIG. 3 provides that laser projection device 11 has both a multimode unit 48 and a modulation unit 46, a laser projection device 11 according to the present invention may also have only one of multimode unit 48 and modulation unit 46 or also both or also neither of the two.

A laser emission area 13, 15 operated in multimode operation generates or emits laser light of multiple oscillation modes simultaneously. A laser beam 60, 61 emitted by such a laser emission area 13, 15 thus has multiple oscillation modes, which may each generate different interference patterns upon incidence on projection plane 80. These are superimposed for the human eye or the human perception, which may decrease the speckle effect.

The laser projection device according to the third specific embodiment of the present invention furthermore has a transformation unit 42 according to FIG. 3. Transformation unit 42 may generate control instructions from predefined image data or video data. With the aid of the control instructions, control unit 40' may control multibeam laser diode unit 10' and/or deflection unit 12. The control instructions may be supplied in such a way that laser beams 60, 61, which are emitted or generated according to the control instructions, are deflected and/or modified by deflection unit 12 according to the control instructions in such a way that a projection pattern is generated according to the predefined image data or video data in projection plane 80. The projection pattern may be generated separately by each deflected laser beam 60', 61'.

The projection pattern may correspond, for example, to a certain color channel of an image to be projected, in particular the red channel. Thus, for example, multiple laser beams 60, 61 may have such wavelengths that the superposition of these laser beams is perceived in the human perception as essentially red. In particular, the multiple laser beams may have wavelengths in the red color spectrum. The multiple laser beams may also have essentially the same wavelength. If multiple laser beams, in the exemplary embodiment shown in FIG. 3, two laser beams 60, 61, thus generate the same projection pattern, for example, which corresponds to the red channel of an image to be projected, the two projection patterns are superimposed in human perception. The different deflected laser beams 60', 61' each generate different interference patterns on projection plane 80, which are superimposed in human perception, which may result in a reduction of the speckle effect.

Figure 4:
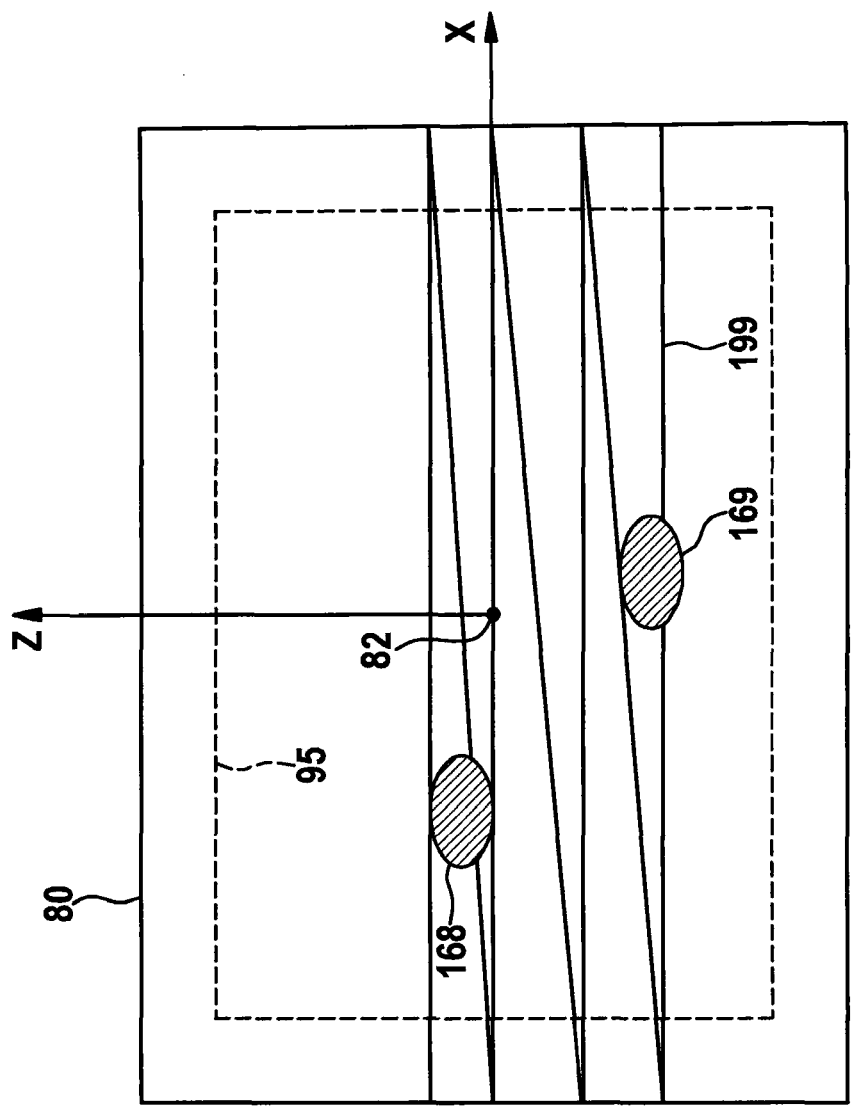
FIG. 4 shows an exemplary course of scanning lines on a projection surface by a laser projection device, in which differently deflected laser beams in the projection plane do not run on the same scanning line.

FIG. 4 schematically shows an exemplary course of scanning lines of a projection surface by a laser projection device, which is not designed in such a way that differently deflected laser beams in the projection plane run on the same scanning line.

FIG. 4 schematically shows a frontal view of a projection plane 80. The illustration is not true to scale. An image is to be created within desired image surface 95 on projection plane 80. Projection plane 80 is provided with a coordinate system in the Z and X directions, which originates from an origin 82, to simplify the description. In the exemplary laser projection device according to FIG. 4, projection point 168 of a first deflected laser beam runs along a first scanning line 197 at a first point in time t1. A second laser projection point 169 is located at the same point in time t1 on a second scanning line 199. The control device of the exemplary laser projection device according to FIG. 4 must therefore accordingly provide control instructions simultaneously for both scanning lines 197, 199.

Figure 5:
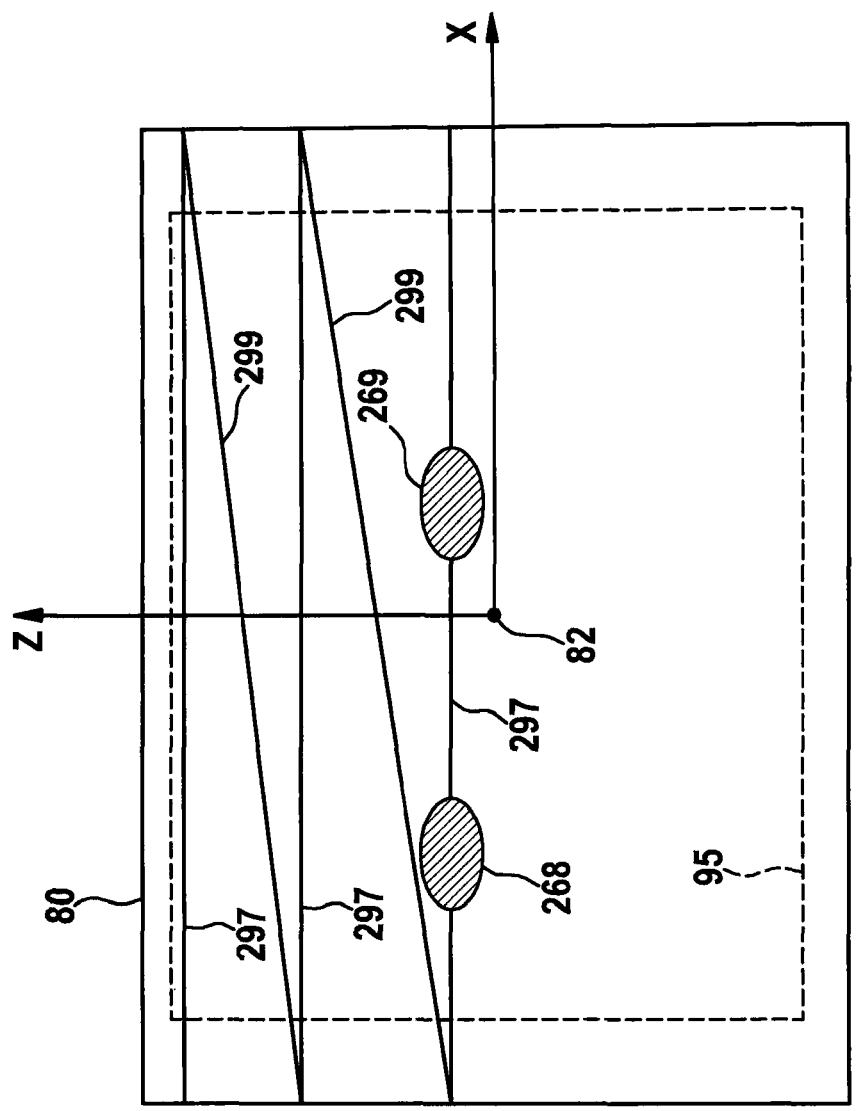
FIG. 5 shows the course of scanning lines on a projection surface according to a fourth specific embodiment of the present invention.

FIG. 5 shows the course of scanning lines on a projection surface according to a fourth specific embodiment of the present invention.

According to FIG. 5, first scanning lines 297 run parallel to the X direction, which runs parallel to longer sides of image surface 95, which is horizontally aligned. Second scanning lines 299 run between first scanning lines 297 and in each case connect an end point and a starting point of successive first scanning lines 297. According to the present invention, projection points 268, 269 of multiple different deflected laser beams run along the same scanning line, for example, at point in time t1 shown in FIG. 4 on a horizontal scanning line 297. Projection points 268, 269 mean here that at these points at certain points in time visible laser points would result if corresponding laser beams 60, 61 would be emitted in real time. For example, the scanning lines shown in FIG. 5 may be implemented by the second specific embodiment of the present invention shown in FIG. 2. For example, first mirror axis of rotation 52 may be situated in a plane with the Z axis and second mirror axis of rotation 56 may be situated in a plane with the X axis. During a movement of first mirror 50, second mirror 54 may initially be held motionless, so that projection points 68, 69, 268, 269 of differently deflected laser beams 60', 61' move in a first rotational direction horizontally on a first scanning line 297 as a result of the rotation of first mirror 52. If first mirror 52 then moves in a second rotational direction opposite to the first rotational direction, second mirror 56 may be moved in such a way that projection points 268, 269 move on a diagonal second scanning line 299. It may be provided that laser projections only actually occur on the image surface, i.e., visible laser points arise, when projection points run along horizontal scanning lines 297.

The laser projection device may be designed in such a way that the same projection pattern is generated separately in projection plane 80 by each deflected laser beam 60', 61'. For example, a visible laser point may be generated at projection point 269 by a first deflected laser beam 60' at point in time t1 according to one projection pattern. At a later point in time, second projection point 268 of a second deflected laser beam 61' will be located at the location at which first projection point 269 of first deflected laser beam 60' was located at point in time t1. A visible laser point may also be generated by second deflected laser beam 61' at second point in time t2. For an observer, the visible laser points generated at points in time t1 and t2 in each case at the same location may be superimposed and thus reduce the speckle effect.

FIG. 6 shows the course of scanning lines on a projection surface according to a fifth specific embodiment of the present invention.

According to FIG. 6, third scanning lines 397 each run parallel to one another, and fourth scanning lines 399 each run parallel to one another. Fourth scanning lines 399 connect in each case one end point and one starting point of successive third scanning lines 397.

According to the present invention, projection points 368, 369 of multiple different deflected laser beams run along the same scanning line, at point in time t3 shown in FIG. 4 on a fourth scanning line 399. The scanning lines shown in FIG. 5 may be implemented, for example, by the second specific embodiment of the present invention shown in FIG. 2. Mirror axes of rotation 52, 56 may be situated as described with reference to FIG. 5, second mirror 56 being continuously pivoted. The rotation of second mirror 56 occurs more slowly than the rotation of first mirror 52, for example.

According to further specific embodiments, generated laser beams 60, 61 may be collimated by collimator unit 30 and deflected and/or modified in another way by deflection unit 12, 30, 32, 50, 54 in such a way that on projection surface 80, the particular "fast axes" of deflected laser beams 60', 61' are aligned along scanning line 99, along which deflected laser beams 60', 61' move on projection surface 80. "Fast axes" are directions in which laser beams, depending on the generation and in particular the collimation, propagate more rapidly than in other directions. In FIG. 4, FIG. 5, and FIG. 6, this is shown by an elliptical shape of projection points 168, 169, 268, 269, 368, 369, which are shown greatly enlarged, the main axis of the ellipse being aligned in each case along corresponding scanning line 197, 199, 297, 299, 397, 399. Collimator unit 30 may alternatively also be designed in such a way that the projection points are essentially circular, for example, by way of the use of two cylinder lenses in collimator unit 30.

Although the present invention was described above on the basis of preferred exemplary embodiments, it is in no way restricted thereto, but rather is modifiable in manifold ways.

What is claimed is:

1. A laser projection device for projecting laser beams onto a projection plane, comprising:
   a controllable multibeam laser diode unit;
   a controllable optical deflection unit for deflecting laser beams generated by the multibeam laser diode unit; and
   a control unit for controlling the deflection unit to move the laser beams deflected by the deflection unit onto the projection plane along a scanning line in such a way that different ones of the deflected laser beams run on the same scanning line in the projection plane;
   wherein the multibeam laser diode unit is integrated into a semiconductor body, which has at least two laser emission areas separate from one another, via which the at least two laser beams are generated independently of one another, and
   wherein the control unit has a multimode unit, which is configured to operate at least one laser emission area of the multibeam laser diode unit in multimode operation, in which laser light of multiple different oscillation modes is generated simultaneously.

2. The laser projection device as recited in claim 1, wherein the deflection unit has at least two pivotable mirrors, an actuator controllable via the control unit and associated with each mirror to pivot the particular associated mirror around a particular mirror axis of rotation.

3. The laser projection device as recited in claim 2, wherein the mirrors are situated and are controllable via the control unit in such a way that by pivoting at least one first mirror around a first mirror axis of rotation and by pivoting at least one second mirror around one second mirror axis of rotation, the generated laser beams are movable longitudinally along the scanning lines and the scanning lines on the projection surface pass through a predefinable image surface on the projection surface in a zigzag.

4. The laser projection device as recited in claim 1, wherein the deflection unit has a collimator unit, and wherein the collimator unit and the multibeam diode unit are controllable by the control unit in such a way that the laser beams generated by the multibeam laser diode unit traverse the collimator unit.

5. The laser projection device as recited in claim 3, wherein the first mirror and the second mirror include polygon mirrors, and wherein the actuators are controllable via the control unit in such a way that the polygon mirrors pivot in the same rotational direction.

6. The laser projection device as recited in claim 3, wherein the first mirror and the second mirror include flat mirrors, and wherein the actuators are activatable via the control unit in such a way that the flat mirrors are always pivoted back and forth within a particular corresponding predefined angle range.

7. The laser projection device as recited in claim 1, wherein the control unit has a transformation unit, which is designed to generate control instructions from predefined image data or video data in such a way that the laser beams, which are generated by the multibeam laser diode unit via the control unit with the aid of the control instructions, are deflected with the aid of the deflection unit, which is controlled via the control unit using the control instructions, so that, in the projection plane, a projection pattern is separately generated by each deflected laser beam according to the predefined image data or video data.

8. The laser projection device as recited in claim 7, wherein the control unit has a buffer memory unit, by which at least one of the control instructions generated by the transformation unit are storable, and the predefined image data or video data, from which control instructions may be generated by the transformation unit, are storable.

9. The laser projection device as recited in claim 1, wherein the control unit has a modulation unit, which is designed to modulate at least one laser emission area of the multibeam laser diode unit using a modulation frequency.

10. The laser projection device as recited in claim 1, wherein the laser emission areas are designed in such a way that the generated laser beams have wavelengths which lie within a narrow wavelength range.

11. The laser projection device as recited in claim 10, wherein the wavelengths lie in the red light spectrum.

12. A laser projection method for projecting laser beams onto a projection plane, the method comprising:
generating laser beams via a controllable multibeam laser diode unit;
deflecting, via a controllable optical deflection unit, the generated laser beams so that the deflected laser beams move onto a projection plane along a scanning line so that different deflected laser beams run in the projection plane on the same scanning line, wherein the controllable optical deflection unit is controlled by a control unit;
wherein the multibeam laser diode unit is integrated into a semiconductor body, which has at least two laser emission areas separate from one another, via which the at least two laser beams are generated independently of one another, and wherein the control unit has a multimode unit, which is configured to operate at least one laser emission area of the multibeam laser diode unit in multimode operation, in which laser light of multiple different oscillation modes is generated simultaneously.

13. The method as recited in claim 12, wherein the deflection unit has at least two pivotable mirrors, an actuator controllable via the control unit and associated with each mirror to pivot the particular associated mirror around a particular mirror axis of rotation.

14. The method as recited in claim 13, wherein the mirrors are situated and are controllable via the control unit in such a way that by pivoting at least one first mirror around a first mirror axis of rotation and by pivoting at least one second mirror around one second mirror axis of rotation, the generated laser beams are movable longitudinally along the scanning lines and the scanning lines on the projection surface pass through a predefinable image surface on the projection surface in a zigzag.

15. The method as recited in claim 12, wherein the deflection unit has a collimator unit, and wherein the collimator unit and the multibeam diode unit are controllable by the control unit in such a way that the laser beams generated by the multibeam laser diode unit traverse the collimator unit.

16. The method as recited in claim 14, wherein the first mirror and the second mirror include polygon mirrors, and wherein the actuators are controllable via the control unit in such a way that the polygon mirrors pivot in the same rotational direction.

17. The method as recited in claim 14, wherein the first mirror and the second mirror include flat mirrors, and wherein the actuators are activatable via the control unit in such a way that the flat mirrors are always pivoted back and forth within a particular corresponding predefined angle range.

18. The method as recited in claim 12, wherein the control unit has a transformation unit, which is designed to generate control instructions from predefined image data or video data in such a way that the laser beams, which are generated by the multibeam laser diode unit via the control unit with the aid of the control instructions, are deflected with the aid of the deflection unit, which is controlled via the control unit using the control instructions, so that, in the projection plane, a projection pattern is separately generated by each deflected laser beam according to the predefined image data or video data.

19. The method as recited in claim 18, wherein the control unit has a buffer memory unit, by which at least one of the control instructions generated by the transformation unit are storable, and the predefined image data or video data, from which control instructions may be generated by the transformation unit, are storable.

20. The method as recited in claim 12, wherein the control unit has a modulation unit, which is designed to modulate at least one laser emission area of the multibeam laser diode unit using a modulation frequency.

21. The method as recited in claim 12, wherein the laser emission areas are designed in such a way that the generated laser beams have wavelengths which lie within a narrow wavelength range.

22. The method as recited in claim 21, wherein the wavelengths lie in the red light spectrum.

* * * * *